(12) United States Patent
Thompson

(10) Patent No.: US 6,532,329 B1
(45) Date of Patent: Mar. 11, 2003

(54) IDENTIFICATION SCHEME FOR SPLITTABLE RIBBON PRODUCTS

(75) Inventor: Justin Thompson, Huntersville, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/538,289

(22) Filed: Mar. 29, 2000

(51) Int. Cl.[7] ................................................. G02B 6/44
(52) U.S. Cl. ................................................... 385/114
(58) Field of Search ........................... 385/106, 114

(56) References Cited

U.S. PATENT DOCUMENTS

| | | | |
|---|---|---|---|
| 4,848,868 A | | 7/1989 | Rohner |
| 4,900,126 A | * | 2/1990 | Jackson et al. ............... 385/114 |
| 5,082,347 A | | 1/1992 | Akasaka et al. |
| 5,166,998 A | | 11/1992 | Patel |
| 5,379,363 A | | 1/1995 | Bonicel et al. |
| 5,485,539 A | | 1/1996 | Mills |
| 5,524,164 A | | 6/1996 | Hattori et al. |
| 5,802,231 A | * | 9/1998 | Nagano et al. ............... 385/114 |
| 5,809,195 A | | 9/1998 | Brown et al. |
| 5,905,835 A | * | 5/1999 | Bourghelle et al. ......... 385/114 |
| 6,175,677 B1 | * | 1/2001 | Yang et al. .................. 385/114 |
| 6,195,491 B1 | * | 2/2001 | Jackson et al. ............... 385/114 |
| 6,253,013 B1 | * | 6/2001 | Lochkovic et al. ......... 385/114 |
| 6,327,409 B1 | * | 12/2001 | Chabot et al. ............... 385/114 |
| 6,337,941 B1 | * | 1/2002 | Yang et al. .................. 385/114 |
| 6,370,304 B1 | * | 4/2002 | Mills et al. .................. 385/114 |

OTHER PUBLICATIONS

Patent Abstracts of Japan, Publication No. 09184949, dated Jul. 15, 1997.
Patent Abstracts of Japan, Publication No. 02282709, dated Nov. 20, 1990.

* cited by examiner

Primary Examiner—Tulsidas Patel
Assistant Examiner—Thanh-Tam Le
(74) Attorney, Agent, or Firm—Sughrue Mion, PLLC

(57) ABSTRACT

An optical fiber ribbon product that includes at least two sub-unit ribbons each having a plurality of optical fibers encapsulated in a matrix material. The sub-units are arranged adjacent each other and include identifying stripes respectively extending longitudinally along the exterior of the matrix materials. The stripe on the first sub-unit has a visual appearance that is different from the stripe on the second sub-unit to allow the sub-units to be distinguished from each other. A bonding material substantially encapsulates the first and second sub-units. In one embodiment, the bonding material is transparent and fully encapsulates the stripes. In another embodiments, the stripes made of a film and are not encapsulated by the bonding material so that they can be peeled to access the optical fibers and/or sub-unit ribbons.

11 Claims, 5 Drawing Sheets

IDENTIFICATION SCHEME FOR SPLITTABLE RIBBON PRODUCTS

BACKGROUND OF THE INVENTION

1. Field of the Invention

The present invention is directed to splittable optical-fiber ribbon products and, more particularly, to optical-fiber ribbon products containing a plurality of sub-unit ribbons that are individually identifiable.

2. Related Art

Optical fiber ribbons consist of a planar array of optical fibers joined together by a resin matrix material or the like. Such ribbons are becoming increasingly popular where optical fibers are used for data transmission and the like. This is due, in part, to the fact that optical fiber ribbons may contain a relatively large number of optical fibers in a package that allows for easy handling and installation. Further, because optical fiber ribbons reduce the need for manipulating individual optical fibers, optical fiber maintenance procedures are simplified. Often, a single cable will include numerous optical fiber ribbons, stacked one on another or otherwise disposed in the cable as sub-units.

It is desirable to be able to easily identify and distinguish optical fiber ribbons one from another and to distinguish constituent elements of a given optical fiber ribbon, both before and after the ribbons are installed in the field for use. Conventionally, ribbon identification has been accomplished by printing characters, such as words, on the ribbon surface or using ink jet printing methods or by applying a bar code to the ribbon, as disclosed in U.S. Pat. No. 5,809,195. Once the identifying characters have been printed on the ribbon (using ink jet methods or the like), the printed characters are susceptible to smearing. Such smearing may render the printed characters illegible. Even when the characters are not smeared, their small size makes it very difficult to read them, particularly in the field where lighting conditions tend to be poor. Also, matching particular printed characters (e.g., particular languages) to particular markets and/or customers can be a difficult and expensive task.

SUMMARY OF THE INVENTION

It is an object of the present invention to overcome the drawbacks of the above related art. More particularly, it is an object of the present invention to provide an optical fiber ribbon product which can be easily manufactured and which allows the individual sub-units to be easily identified in the field.

It is a further object of the invention to provide an optical fiber ribbon product in which the individual optical fibers can be accessed easily and quickly. More particularly, it is an object of the present invention to provide an optical fiber ribbon product in which the optical fibers can be accessed by a simple peeling process, thereby reducing the installation time in the field.

The present invention achieves the above and other objects and advantages by providing an optical fiber ribbon product, comprising a first sub-unit including a first plurality of optical fibers arranged substantially in a plane and encapsulated by a first matrix material and a first stripe extending along an outside surface of the first matrix material; and a second sub-unit including a second plurality of optical fibers arranged substantially in a plane and encapsulated in a second matrix material and a second stripe extending along an outside surface of the second matrix material. The first sub-unit and the second sub-unit are disposed adjacent one another and a bonding material at least partially encapsulates the first sub-unit and the second sub-units. The first stripe has a different visual appearance from the second stripe such that the first stripe identifies the first sub-unit and the second stripe identifies the second sub-unit.

According to one aspect of the invention, the bonding material is transparent and fully encapsulates the first stripe and the second stripe. Further, the stripes include either a film strip or a UV curable ink (colored by pigment or dye) applied to the outer surface of the matrix materials. According to a preferred embodiment, the first stripe has a different color from the second stripe.

According to a further aspect of the invention, the stripes are formed by first and second films and the exterior surfaces of the first film and the second film are substantially coplanar with an exterior surface of the bonding material. Further, the first film is bonded to the first matrix material and the second film is bonded to the second matrix material. Therefore, the first matrix material can be stripped by peeling the first film and the second matrix material can be stripped by peeling the second film.

According to a further aspect of the invention, the first film includes a plurality of first individual strips corresponding in number to the first optical fibers and the second film include a second plurality of individual strips corresponding in number to the second optical fibers. The first individual strips are respectively aligned with the first optical fibers and the second individual strips are aligned with the second optical fibers. Therefore, the optical fibers of each of the sub-units can be individually accessed by selectively peeling the film strips.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views and wherein.

DETAILED DESCRIPTION OF THE INVENTION

Figure 1:
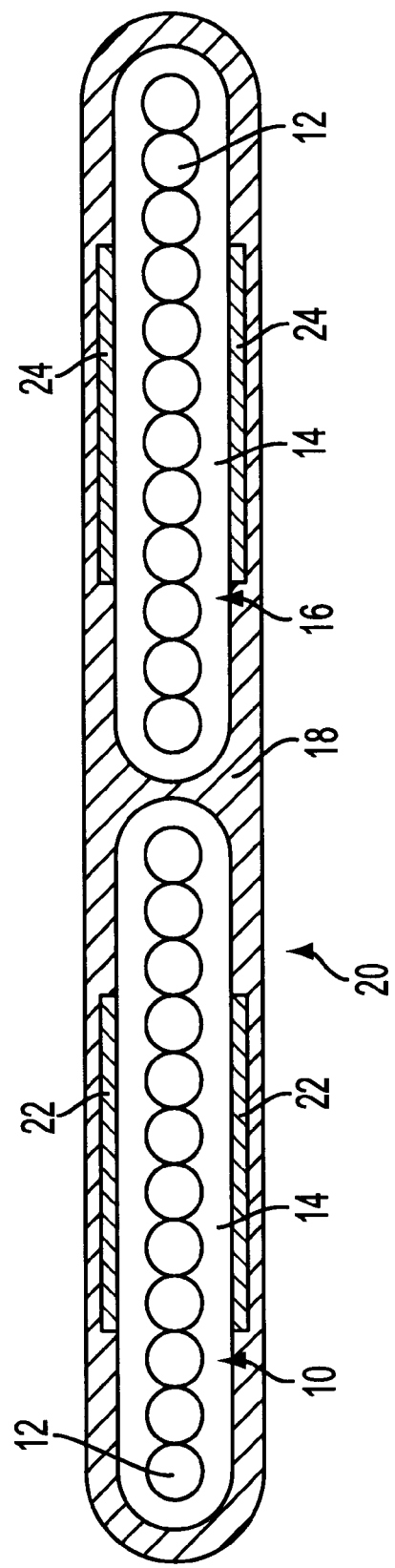
FIG. 1 is a sectional view of an optical fiber ribbon product according to a first embodiment of the present invention.

A first embodiment of the present invention will now be described with reference to FIGS. 1. FIG. 1 depicts a splittable optical fiber ribbon product which includes a plurality of sub-unit ribbons each having a plurality of optical fibers encapsulated in a matrix material. Although any number of sub-unit ribbons may be encapsulated together, only two sub-unit ribbons are shown. As shown in FIG. 1, a first sub-unit ribbon 10 includes a plurality of optical fibers 12 which are encapsulated by matrix material 14. Similarly, a second sub-unit ribbon 16 includes a plurality of optical fibers 12 which are encapsulated by a matrix material or layer 14. The first and second sub-unit ribbons 10, 16 are then fully encapsulated by encapsulation material or layer 18 to form a splittable optical-fiber ribbon product 20. In the illustrated embodiment, there are twelve optical fibers 12 in each sub-unit, although the invention is naturally not limited to this particular arrangement.

According to the first embodiment of the invention, colored stripes 22, 24 are respectively applied to the outer surface of the sub-unit ribbons 10 and 16 prior to being encapsulated in the encapsulating material 18. For example, an orange colored stripe 22 may be applied to the first sub-unit 10 and a blue colored stripe 24 may be applied to the second sub-unit 16. Since the encapsulating material 18 in this embodiment is made of a transparent material, the sub-units can be easily distinguished from each other by the colored stripes. The advantage with this arrangement is that the stripes 22 and 24 are protected from the environment and can easily be detected in the field.

Figure 5:
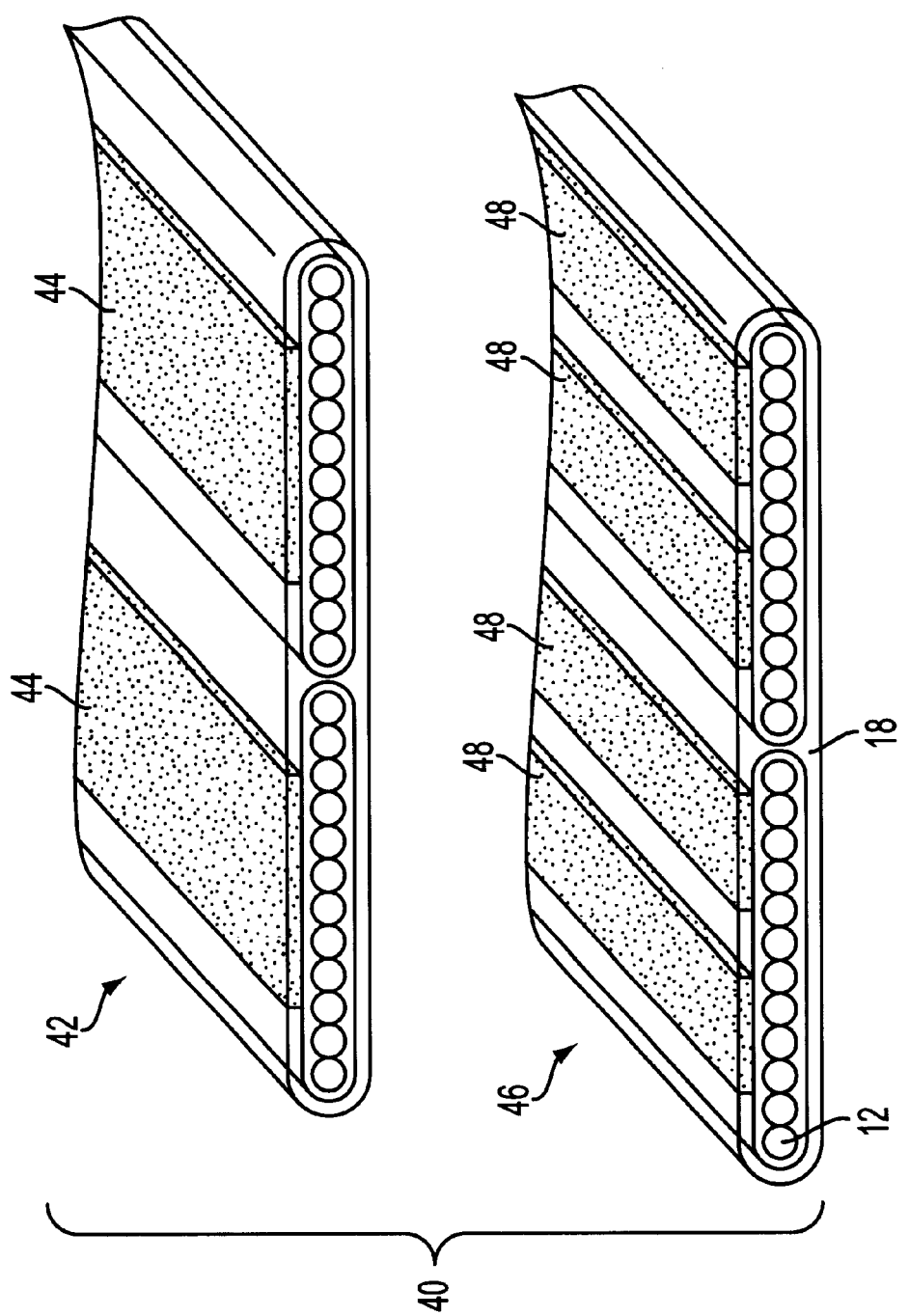
FIG. 5 is a perspective view of an optical fiber ribbon product according to yet another embodiment of the present invention.

According to the invention, the colored stripes can be in various different forms. For example, the colored stripes can be formed by applying a thin film, with or without an adhesive, to the outer surfaces of the matrix materials such that the films are encapsulated between the sub-units 10, 16 and the encapsulating material 18. This film may be comprised of any flexible, colorable, thin film material with relatively low thermal shrinkage properties. Examples of some potential materials might be derivatives of polypropylene, polyethylene, acetate or other polymeric materials, or even a thin foil metal (although certain metals may have undesirable degradation properties). Alternatively, the colored stripes can be formed of an ink layer made of UV curable material, which, if properly selected for material properties, will form a tape-like structure, on the surface of the ribbon to which it is applied, when polymerized by exposure to UV radiation. Naturally, the invention is not intended to be limited to these arrangements. Further, although the stripes are shown as being applied to top and bottom surfaces of the sub-units, it is understood that they need only be applied to one side. The colored stripes are applied so as to extend along the length of the sub-units. See, e.g., FIG. 5, which is directed to a different embodiment of the invention discussed below.

Figure 2:
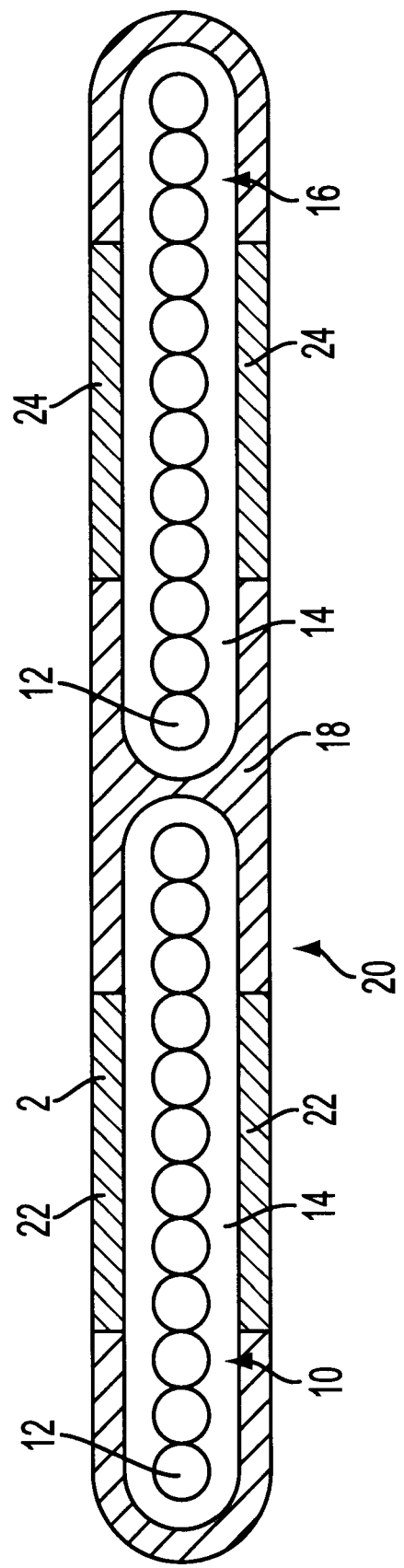
FIG. 2 is a sectional view of an optical fiber ribbon product according to a second embodiment of the present invention.

FIG. 2 illustrates a second embodiment of the invention. The difference between this embodiment and the FIG. 1 embodiment is that the colored stripes 22 and 24 are made of a thin film which has substantially the same thickness as the encapsulating material or layer 18 such that the outer surfaces of the colored stripes or film 22, 24 and the encapsulating layer 14 are substantially coplanar. The advantage with this arrangement is that the colored stripes or films 22, 24 can be stripped from their respective sub-units 10, 16 to enhance the peeling properties of the sub-units (i.e., the accessibility to the fibers in each sub-unit).

According to a further aspect of the invention, the colored stripes 22, 24 ,may be made out of a thin film that includes an adhesive which strongly adheres to the matrix materials 14 of the sub-units 10 and 16. Thus, with this arrangement, the field technician can obtain direct access to the individual fibers 12 by stripping the colored film stripes 22, 24 because the peeling of the film will cause the matrix material 14 to also be peeled back from the sub-units. Hence, the colored stripes could be used as a substitute for a conventional peel board which is otherwise necessary to peel back the matrix material. An important advantage is that it would be possible for the technician to peel the color identifying stripe to access the fibers.

Figure 3:
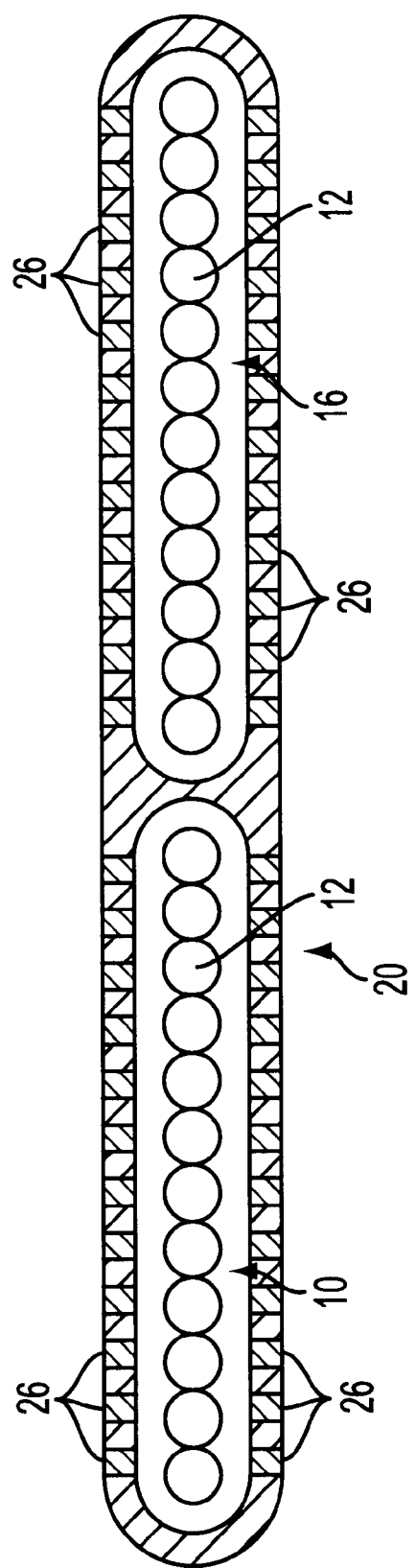
FIG. 3 is a sectional view of an optical fiber ribbon product according to a third embodiment of the present invention.

According to a further aspect of the invention, the colored film stripes 22, 24 can be segmented into longitudinally extending strips 26 corresponding in number to the number of optical fibers 12 in the sub-unit. Hence, with this arrangement, there is an individual film strip 26 extending parallel to each of the optical fibers 12 for each sub-unit 10 and 16. Specifically, with reference to FIG. 3, in the illustrated example that includes twelve optical fibers 12 for each sub-unit 10, 16, there are twelve individual colored film strips 26 respectively aligned with the optical fibers 12, with the film strips 26 associated with the first sub-unit 10 being one color and the film strips 26 of the second sub-unit 16 being a different color. Hence, if a technician wishes to access a particular optical fiber 12, this can be accomplished by pulling the first colored strip 26 aligned with the fiber.

Figure 4:
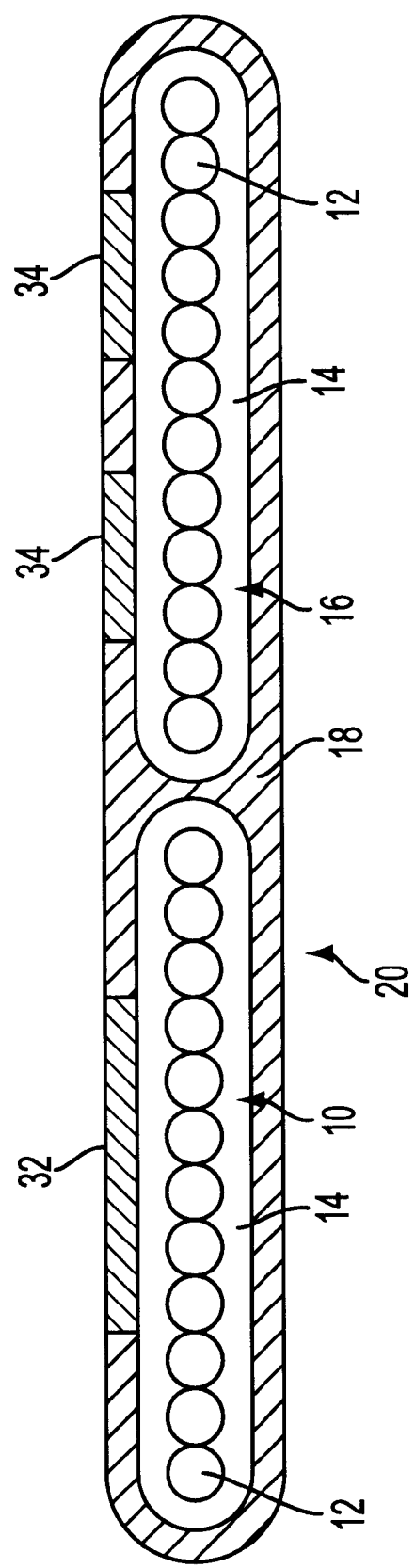
FIG. 4 is a sectional view of an optical fiber ribbon product according to a fourth embodiment of the present invention.

FIG. 4 illustrates another embodiment of the present invention. As an alternative to identifying the individual sub-units by color, e.g. the blue colored stripe 22 v. orange colored stripe 24 (see FIG. 1), the sub-units can be identified by using a different number of stripes, such as a single stripe 32 for the first sub-unit 10 and double stripes 34 for the second sub-unit 16, as shown in FIG. 4. Naturally, the invention is not limited to this arrangement. For example, instead of using differing numbers of stripes, the sub-units can be identified using different geometrical shapes, such as squares for the first sub-unit 10 and triangles for the second sub-unit 16.

In the event a cable 40 includes more than 12 sub-units, such as 24 sub-units, the sub-units can be divided into two groups of 12 and separately identified using the above technique. For example, with reference to FIG. 5, each sub-unit of the first group 42 could be identified with a single stripe 44, but using 12 different colors (e.g. blue for first sub-unit, red for second sub-unit, green for third sub-unit, orange for fourth sub-unit, etc) and each sub-unit of the second group 46 could be identified with two stripes 48 having the same different colors. Thus, one could distinguish between the blue optical fiber of the third sub-unit (green stripe) of the first group (single stripe) and the blue optical fiber of the third sub-unit (green stripes) of the second group (two stripes). For simplicity, FIG. 5 only shows two sub-units for each group.

While the present invention has been described with respect to what is presently considered to be the preferred embodiments, the present invention is not limited to the disclosed embodiments. Rather the present invention covers various modifications and equivalent arrangements included within the spirit and scope of the appended claims. The scope of the appended claims is to be accorded the broadest interpretation so as to encompass all such modifications and equivalent structures and functions.

We claim:

1. An optical fiber ribbon product, comprising:
   a first sub-unit comprising a first plurality of optical fibers arranged substantially in a plane and encapsulated by a first matrix material and a first stripe extending along an outside surface of said first matrix material;
   a second sub-unit comprising a second plurality of optical fibers arranged substantially in a plane and encapsulated in a second matrix material and a second stripe extending along an outside surface of said second matrix material, said first sub-unit and said second sub-unit being disposed adjacent one another; and a bonding material at least partially encapsulating said first sub-unit and said second sub-units, wherein said first stripe has a different visual appearance from said second stripe such that said first stripe identifies said first sub-unit and said second stripe identifies said second sub-unit, wherein said first stripe and said second stripe comprise a first film and a second film, respectively, and wherein said first film is bonded to said first matrix material and said second film is bonded to said second matrix material, whereby said first matrix material can be stripped by peeling said first film and said second matrix material can be stripped by peeling said second film.

2. The optical fiber ribbon product of claim 1, wherein said bonding material is transparent and fully encapsulates said first stripe and said second stripe.

3. The optical fiber ribbon product of claim 2, wherein at least one of said first and second films comprises a polymeric material.

4. The optical fiber ribbon product of claim 2, wherein said first stripe has a different color from said second stripe.

5. The optical fiber ribbon product of claim 1, wherein said first stripe has a different color from said second stripe.

6. The optical fiber ribbon product of claim 1, wherein said first film has a first color and said second film has a second color.

7. The optical fiber ribbon product of claim 1, wherein exterior surfaces of said first film and said second film are substantially coplanar with an exterior surface of said bonding material.

8. The optical fiber ribbon product of claim 1, where said first and second films are adhesively bonded.

9. The optical fiber ribbon product of claim 8, wherein said first film has a first color and said second film has a second color.

10. The optical fiber ribbon product of claim 7, wherein said first film includes a plurality of first individual strips corresponding in number to the number of said first plurality of optical fibers and said second film includes a second plurality of individual strips corresponding in number to the number of said second plurality of optical fibers.

11. The optical fiber ribbon product of claim 10, wherein said first plurality of individual strips are respectively aligned with said first plurality of optical fibers and said second plurality of individual strips are aligned with said second plurality of optical fibers.

* * * * *